(12) United States Patent
Boldyreva et al.

(10) Patent No.: US 9,596,081 B1
(45) Date of Patent: Mar. 14, 2017

(54) ORDER PRESERVING TOKENIZATION

(71) Applicant: Skyhigh Networks, Inc., Cupertino, CA (US)

(72) Inventors: Alexandra Boldyreva, Atlanta, GA (US); Paul Grubbs, Sunnyvale, CA (US); Nathan Chenette, Terre Haute, IN (US)

(73) Assignee: Skyhigh Networks, Inc., Campbell, CA (US)

( * ) Notice: Subject to any disclaimer, the term of this patent is extended or adjusted under 35 U.S.C. 154(b) by 0 days.

(21) Appl. No.: 14/638,906

(22) Filed: Mar. 4, 2015

(51) Int. Cl.
*H04L 9/06* (2006.01)
*H04L 9/08* (2006.01)
*G06N 7/00* (2006.01)

(52) U.S. Cl.
CPC ........... *H04L 9/0869* (2013.01); *G06N 7/005* (2013.01); *H04L 9/0618* (2013.01); *H04L 2209/24* (2013.01)

(58) Field of Classification Search
CPC .................................................... H04L 9/0618
See application file for complete search history.

(56) References Cited

U.S. PATENT DOCUMENTS

| 2006/0242217 A1* | 10/2006 | Bartels | G06F 17/18 708/270 |
| 2007/0203653 A1* | 8/2007 | Ben-Dor | G06F 19/20 702/19 |
| 2009/0222410 A1* | 9/2009 | Aggarwal | G06F 17/30657 |
| 2011/0282876 A1* | 11/2011 | Tchagang | G06F 19/24 707/737 |
| 2013/0046995 A1* | 2/2013 | Movshovitz | H04L 9/0618 713/189 |
| 2013/0272444 A1* | 10/2013 | Barron | H03M 13/036 375/295 |
| 2014/0089678 A1* | 3/2014 | Teranishi | G06F 21/72 713/189 |
| 2015/0379016 A1* | 12/2015 | Eriksson | G06F 17/30029 707/724 |

OTHER PUBLICATIONS

Cash et al. "Dynamic searchable encryption in very-large databases: Data structures and implementation." Network and Distributed System Security Symposium, NDSS. vol. 14. 2014.
Matthew Skala. "Hypergeometric tail inequalities: ending the insanity." arXiv preprint arXiv:1311.5939 (2013).

* cited by examiner

*Primary Examiner* — Jason C Chiang
(74) *Attorney, Agent, or Firm* — Van Pelt, Yi & James LLP

(57) ABSTRACT

An order-preserving tokenization (OPT) method receives a plaintext and generates a token as the ciphertext which preserves the sort order of the plaintext by using stored legacy plaintext-to-ciphertext mapping data and a tail bounded probability distribution sampler to sample a random order preserving function. More specifically, the OPT method uses a mapping table to store plaintext-to-ciphertext mapping for previously generated ciphertexts. The mapping table enables efficient searching of the ciphertext space as the OPT method only needs to look for ciphertext in the space that most likely will have the desired plaintext. In this manner, the order-preserving tokenization method of the present invention realizes a fast algorithm that is also more computational efficient. In one embodiment, the OPT method uses a tail bounded hypergeometric distribution sampler as the probability distribution sampler.

14 Claims, 6 Drawing Sheets

ORDER PRESERVING TOKENIZATION

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue.

BRIEF DESCRIPTION OF THE DRAWINGS

Various embodiments of the invention are disclosed in the following detailed description and the accompanying drawings.

DETAILED DESCRIPTION

Figure 1:
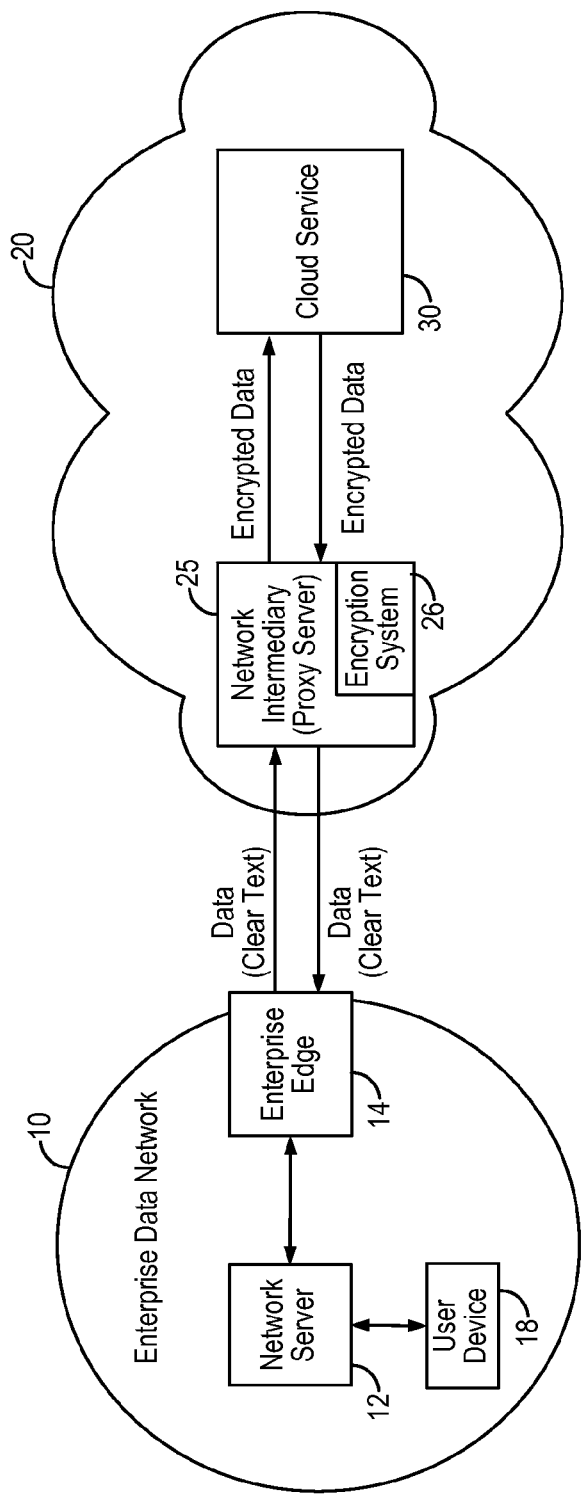
FIG. 1 is a block diagram illustrating a network intermediary implementing encryption of cloud data on behalf of an enterprise in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, an order-preserving tokenization (OPT) method receives a plaintext (clear text) and generates a token as the ciphertext which preserves the sort order of the plaintext by using stored plaintext-to-ciphertext mapping data and a tail bounded probability distribution sampler to sample a random order preserving function. More specifically, the OPT method uses a mapping table to store plaintext-to-ciphertext mapping for previously generated ciphertexts. The mapping table enables efficient searching of the ciphertext space as the OPT method only needs to look for ciphertext in the space that most likely will have the desired plaintext. In this manner, the order-preserving tokenization method of the present invention realizes a fast algorithm that is also more computationally efficient. In one embodiment, the OPT method uses a tail bounded hypergeometric distribution sampler as the probability distribution sampler.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

In the following description, the term "data" will be used to refer to data or files or other resources in any format that is being exchanged in the network environment described herein.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network may redirect network traffic between a client device and a cloud-based service through a network intermediary. The client device may be situated within the enterprise data network or be associated with the enterprise. The network intermediary may provide monitoring and assessment of the enterprise's cloud usage.

In some cases, the network intermediary is used to provide additional security functions, such as data encryption for uploaded data, such as encryption of sensitive data to be stored in a cloud service provider. FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as cloud service 30, that are deployed on the public data network 20. Network traffic form the user device 18 is sent to the network server 12 and travels to the enterprise network edge 14 and then onto the cloud service providers. In the return path, network traffic from the cloud service providers are received at the enterprise network edge 14 and then transmitted onto the network server 12 to be distributed to the user device 18.

Figure 2:
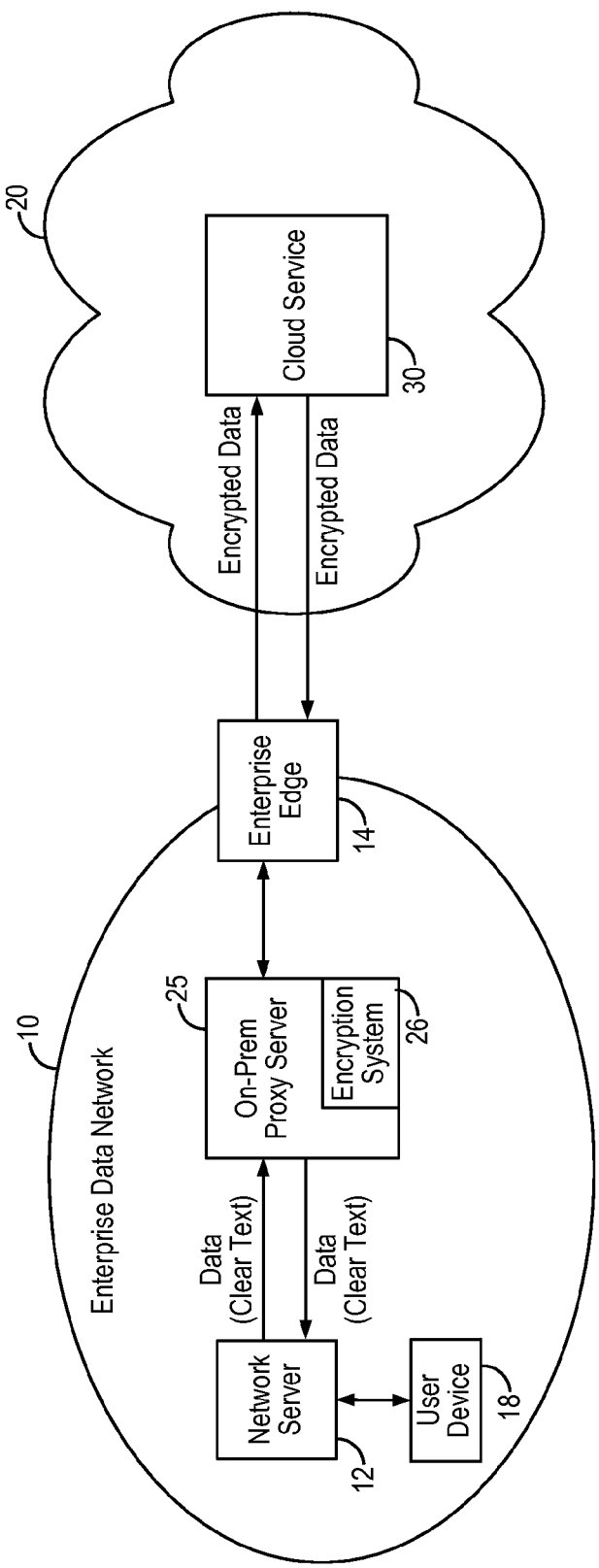
FIG. 2 is a block diagram illustrating a network intermediary implementing encryption of cloud data on behalf of an enterprise in alternate embodiments.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service 30. To implement security of data at rest, the network intermediary 25 may encrypt the outgoing data from the enterprise before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network. In some embodiments, the network intermediary 25 may be an on-premises proxy server deployed within the enterprise data network 10, as shown in FIG. 2. The exact configuration of the network intermediary/proxy server is not critical to the practice of the present invention as long as the network intermediary/proxy server intercepts network traffic from the enterprise data network destined for one or more cloud service providers.

In some embodiments, the network intermediary 25 includes an encryption system 26 which encrypts and decrypts data based on one or more encryption algorithms. The data can be a file or data in any formats. In embodiments of the present invention, the encryption system 26 implements order-preserving encryption. More specifically, the encryption system 26 implements an order-preserving tokenization method as the encryption algorithm to encrypt or encode a plaintext into a ciphertext, as will be explained in more detail below. In the present description, the terms "encrypting" and "encoding" are both used to refer to the encryption of a plaintext into a ciphertext, where the ciphertext term is a token selected to represent the plaintext.

As thus configured, the user device 18 in the enterprise data network 10 uploads data in clear text or plaintext to be processed or stored on the cloud service 30. The user's data is intercepted by the network intermediary 25. The network intermediary 25 encrypts or encodes the plaintext data and forwards the encrypted or encoded data (ciphertext) to the cloud service provider 30 on behalf of the enterprise. In this manner, data security is ensured as data are stored on the cloud service 30 in an encrypted format. Any person accessing the cloud data on the cloud service provider directly will only see encrypted data. When data is to be retrieved from the cloud service 30, the network intermediary 25 retrieves the encrypted data from the cloud service and decrypts or decodes the data. The decrypted or decoded data is then provided to the requesting user device 18 of the enterprise data network 10. With the use of the network intermediary 25 incorporating an encryption system, the enterprise makes use of cloud based services with the security of the cloud data and content being encrypted at rest.

In some embodiments, the enterprise may employ cloud services for maintaining data in a database. Accordingly, the enterprise may store data in a database table at the cloud service where the database table may include fields designated for storing specified data values. For example, the database table may include fields for storing character values, such as names and country, and fields for storing integers, such as social security numbers and birthdays. In some cases, it may be desirable to be able to sort or query the data stored in the database table at the cloud service. Furthermore, the cloud service may need to index the stored data it receives. Accordingly, when data in a database table is to be stored encrypted at rest, it is desirable that the encrypted text or ciphertext preserves the sort order of the corresponding plaintext so that sorting or range query can be performed later on the ciphertext.

In the present description, order-preserving encryption (OPE) is a deterministic encryption scheme using an encryption function that preserves the sort order of the plaintexts. In the present description, sort order refers to the alphabetical or numerical or alpha-numerical ordering of the plaintexts. More specifically, OPE encryption algorithms generate ciphertexts that preserve the sort order of the corresponding plaintexts. When an OPE encryption algorithm is used, encrypted data or ciphertexts stored in a database may be indexed or queried and the database table returns stored encrypted data or ciphertext whose decrypted value fall within the range of the query request. Moreover, in the present description, order-preserving tokenization (OPT) refers to a form of order-preserving encryption (OPE) where a token is generated as the ciphertext to encode the corresponding plaintext.

In general, OPE is a recursive algorithm and is implemented by sampling a random order-preserving function from a specific domain and range on-the-fly. More specifically, OPE can be described as performing a binary search of the random order-preserving function and assigning a ciphertext to a plaintext using ciphertext values within a given ciphertext space. OPE operation typically begins with a large ciphertext space and then narrows down to smaller and smaller ciphertext space over successive recursive cycles. Furthermore, OPE operation employing binary search which starts at the mid-point of the ciphertext space and at each recursive cycle, the search returns at the mid-point of the remaining range. Such binary searching of the large ciphertext space can be time consuming. Accordingly, OPE implementation is generally computationally intensive and the computation speed can be very slow. An example OPE implementation is described in A. Boldyreva, et al., "Order-Preserving Symmetric Encryption," Advances in Cryptology—CRYPTO 2011, 31$^{st}$ Annual International Cryptology Conference, P. Rogaway ed., LNCS, Springer, 2011, which reference is incorporated herein by reference in its entirety.

In embodiments of the present invention, an order-preserving tokenization (OPT) method receives a plaintext (clear text) and generates a token as the ciphertext (or encrypted text) that preserves the sort order of the plaintext by using a mapping table to store legacy plaintext-to-ciphertext mapping data and using a tail bounded probability distribution sampler to sample a random order preserving function. In the present description, a tail bounded probability distribution sampler is also referred to as a tail bounded probability distribution sampling algorithm which is used to sample a function to produce an output. In the present embodiment, the tail bounded probability distribution sampler is used to sample a random order preserving function to product outputs to use as ciphertexts that preserve the sort order of the corresponding plaintexts. In some embodiments, the OPT method of the present invention is an adaptation of an OPE encryption algorithm to an environment in which a mapping table that is initially empty is populated as plaintexts are being tokenized. That is, no a priori plaintext-to-ciphertext mapping data needs to be generated. The mapping table stores the plaintexts being encrypted along with the corresponding ciphertexts as plaintext terms are being received and processed. The OPT method of the present invention is then able to refer to the plaintext-to-ciphertext mapping data in the mapping table for successive tokenization. As a result, the use of the mapping table and a tail bounded probability distribution sampler makes the OPT method of the present invention more computational efficient. In one embodiment, the OPT method uses a tail bounded hypergeometric distribution sampler as the probability distribution sampler.

In the present description, an order-preserving tokenization function refers to an encryption function that generates ciphertext that preserves the sort order (alphabetical or numerical or alpha-numerical) of the plaintext. For example, let F(t) be an order preserving tokenization function, for plaintext values t1 and t2 where t1<t2 in the sort order, the OPT function will generates F(t1) and F(t2) where F(t1)<F(t2).

The OPT method of the present invention is advantageous in applications where the enterprise wishes to have access to the tokens used to encrypt or encode the enterprise's data. For example, the enterprise may be required under government compliance policy that plaintexts must not leave the enterprise premises and the enterprise wishes to store tokens for encrypted data on the enterprise's premises. Meanwhile, the enterprise wants to have its data stored encrypted at rest on the cloud but also wants to maintain sort capability of the cloud-stored data.

In embodiments of the present invention, the OPT method is implemented in the network intermediary or proxy server deployed to intercept network traffic belonging to an enterprise destined for a cloud service provider. In some embodiments, the OPT method is implemented in software on a processor of the proxy server.

Figure 3:
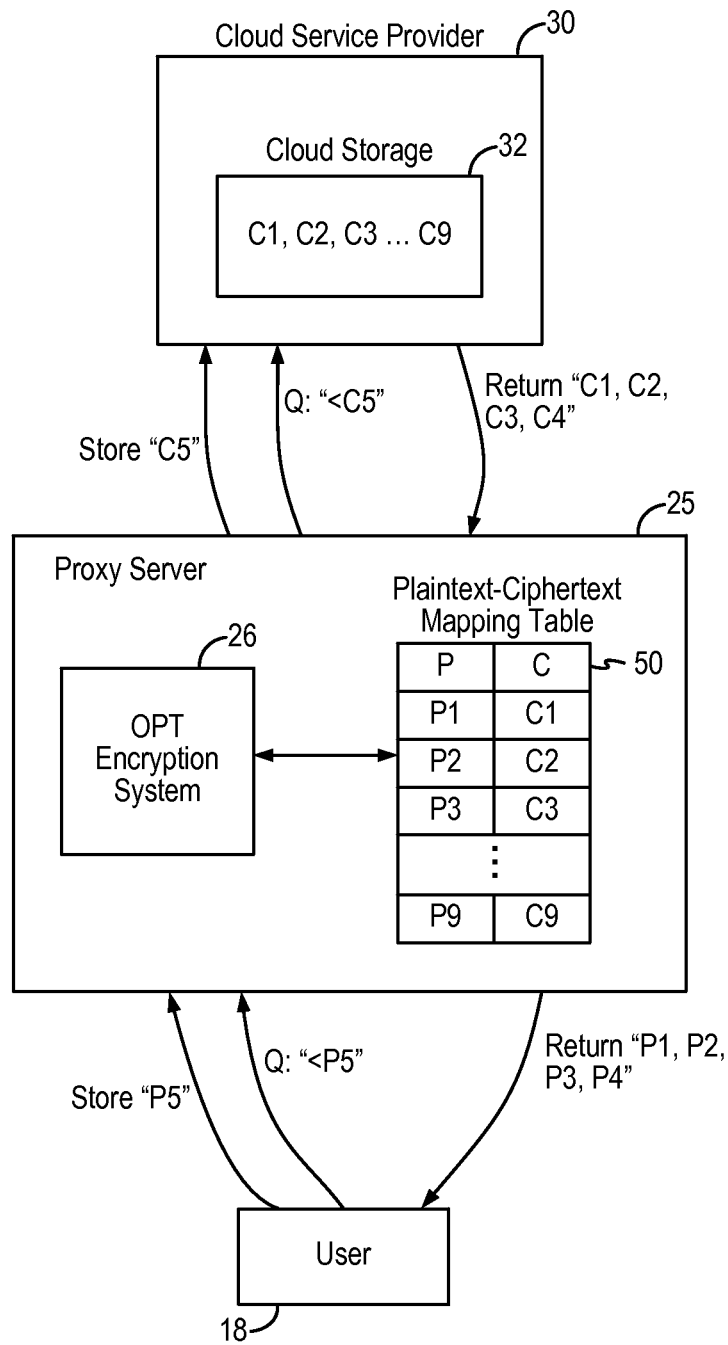
FIG. 3 is a block diagram of an OPT encryption system implemented in a proxy server in embodiments of the present invention.

FIG. 3 is a block diagram of an OPT encryption system implemented in a proxy server in embodiments of the present invention. FIG. 3 illustrates a generalized example of the operation of the OPT method. Referring to FIG. 3, in embodiments of the present invention, proxy server 25 incorporates an OPT encryption system 26 implementing an OPT method according to embodiments of the present invention. The OPT method is configured to encrypt or encode plaintexts received from an enterprise data network, such as from user 18 of the enterprise data network. The proxy server 25 encrypts the plaintexts and forwards the corresponding ciphertexts to a cloud service provider 30 for storage. The OPT encryption system 26 is further configured to decrypt or decode ciphertext received from the cloud service provider 30. The proxy server 25 forwards the plaintext to the user 18 of the enterprise data network.

Traditional encryption algorithms use an encryption key to encrypt plaintexts into ciphertexts. In the OPT method of the present invention, instead of using an encryption key, some random value is used to generate a token. For example, the random value can be generated from a pseudo-random function or a true randomness function. In embodiments of the present invention, to realize order-preserving encryption, the OPT method uses a tail bounded probability sampling algorithm to recursively sample a random order-preserving function $f$.

A salient feature of the OPT method of the present invention is that a mapping of plaintext-to-ciphertext is stored for all plaintexts that has been encrypted. In some embodiments, the plaintext-to-ciphertext mapping is stored in a mapping table 50 in the proxy server 25 and is in communication with the OPT encryption system 26. In some embodiments, the mapping table is initially empty. That is, no a priori plaintext-to-ciphertext mapping data needs to be generated. The mapping table 50 is populated as plaintexts are being encrypted by the OPT encryption system. Accordingly, the mapping table 50 stores legacy plaintext-to-ciphertext mapping data for the enterprise. The legacy plaintext-to-ciphertext mapping data is used in the decryption of ciphertexts as well as in the encryption of plaintext terms not yet present in the mapping table. By providing a mapping of the plaintext-to-ciphertext, encryption of new plaintexts can be performed faster as the OPT method does not need to sample the entire ciphertext space but rather only need to sample in the ciphertext space that most likely will have the desired ciphertext. Furthermore, decryption of ciphertext becomes simplify as merely looking up the plaintexts from the mapping table 50.

FIG. 3 illustrates an example of an encryption operation of the OPT method of the present invention. In some examples, the user 18 intends to store a plaintext P5 on the cloud service provider 30. The data traffic from the user 18 is intercepted by the proxy server 25. The plaintext P5 is provided to the OPT encryption system 26 to be encoded. The OPT method implemented in the OPT encryption system 26 generates a ciphertext token C5 for the plaintext P5 by sampling a random order preserving function and using the mapping data in the mapping table 50. The resulting plaintext to ciphertext mapping P5:C5 is stored in the mapping table 50. The proxy server 25 forwards the token C5 to the cloud service provider 30 for storage.

When the user requests for data stored on the cloud service provider 30, the cloud service provider 30 returns the ciphertext tokens (C1, C2, C3 . . . ). The OPT method implemented in the proxy server 25 performs a table look-up in the mapping tabling 50 using the received ciphertext tokens to recover the corresponding plaintext terms. The proxy server 25 then returns the plaintext terms (P1, P2, P3 . . . ) to the user 18.

FIG. 3 further illustrates an example of a query operation using the OPT method of the present invention. When the user 18 of the enterprise wishes to search for a data or perform a range query for data stored in the cloud service provider 30, the user 18 may transmit a query request. For example, the user may transmit a query request for "all plaintext less than P5 in the alphabet" or Q: "<P5". The proxy server 25 intercepts the query request. The OPT method transforms the query request in plaintext to a query request based on the ciphertext. For example, the OPT method generates the query request as "all ciphertext less than C5" in response to the plaintext query request. The plaintext P5 may be a previously processed term and the OPT encryption system 26 may be able to perform a table look-up from the mapping table 50 to retrieve the corresponding ciphertext term C5. Alternately, the plaintext P5 may not be present in the mapping table and the OPT method generates the ciphertext term C5 corresponding to the plaintext P5.

The proxy server 25 forwards the query request (Q: "<C5") to the cloud service provider 30. The cloud service provider 30 operates on the ciphertext-based query request and generates the query result. In the present example, the cloud service provider 30 returns the query result "C1, C2, C3 and C4" to the proxy server 25. The OPT method decrypts or decodes the query result using the plaintext-to-ciphertext mapping table 50. The OPT method retrieves the plaintext P1, P2, P3 and P4 from the mapping table 50. The proxy server 25 then returns the plaintext query result P1, P2, P3 and P4 to the user 18.

Figure 4:
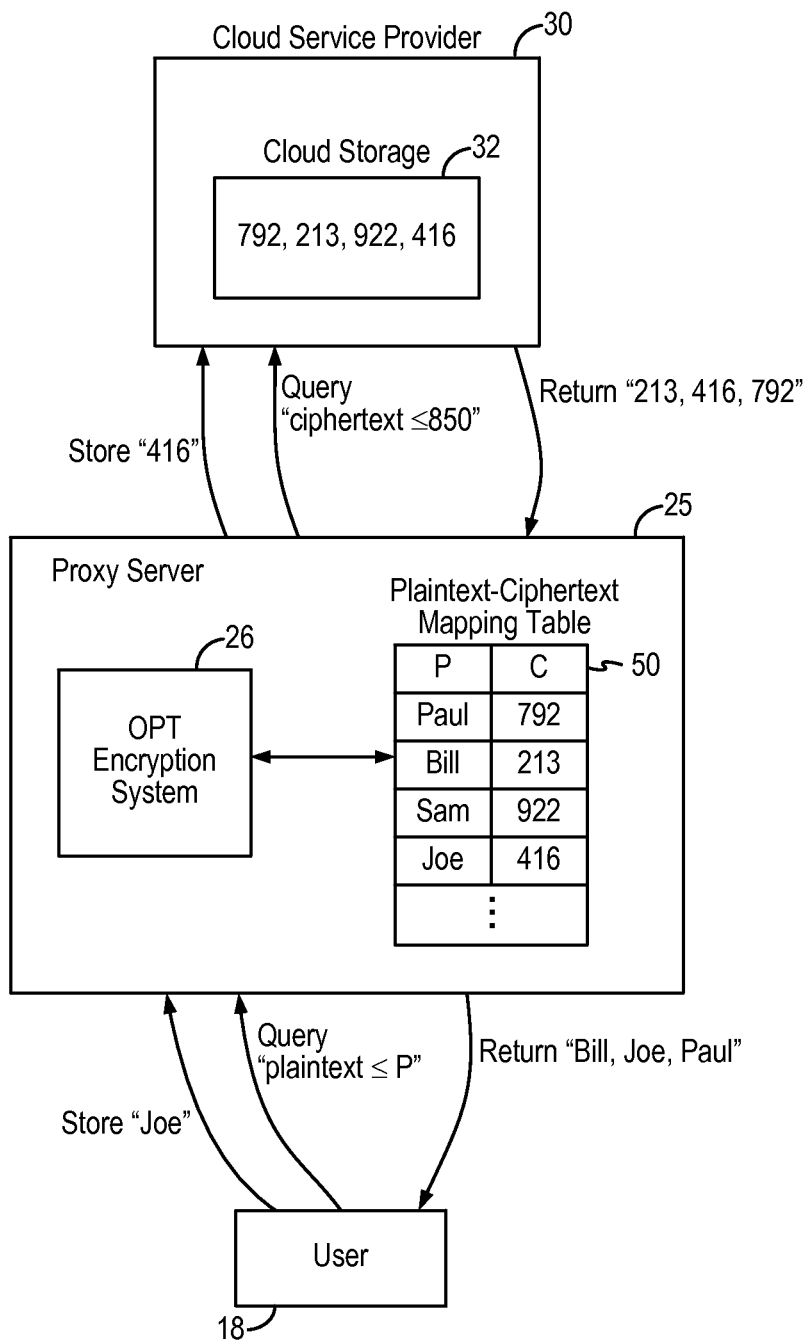
FIG. 4 is a block diagram of an OPT encryption system implemented in a proxy server in embodiments of the present invention.

FIG. 4 is a block diagram of an OPT encryption system implemented in a proxy server in embodiments of the present invention. FIG. 4 illustrates the operation of the OPT method as well as a query of the stored data through the proxy server. Referring to FIG. 4, in embodiments of the present invention, proxy server 25 incorporates an OPT encryption system 26 implementing an OPT method configured to encrypt or encode plaintext received from an enterprise data network, such as from user 18 of the enterprise data network. The proxy server 25 forwards the ciphertext to a cloud service provider 30 for storage. The OPT encryption system 26 is further configured to decrypt or decode ciphertext received from the cloud service provider 30. The proxy server 25 forwards the plaintext to the user 18 of the enterprise data network. The OPT encryption system 26 includes a plaintext-to-ciphertext mapping table 50 stored in the proxy server 25 to facilitate the encoding and decoding operation.

FIG. 4 illustrates an example of an encryption operation of the OPT method of the present invention. In some examples, the user 18 intends to store a plaintext "Joe" on the cloud service provider 30. The data traffic from the user 18 is intercepted by the proxy server 25. The plaintext "Joe" is provided to the OPT encryption system 26 to be encoded. The OPT method implemented in the OPT encryption system 26 selects a ciphertext token "416" for the plaintext "Joe". The plaintext-to-ciphertext mapping is stored in the mapping table 50. The proxy server 25 then forwards the token "416" to the cloud service provider 30 for storage.

When the user requests for data stored on the cloud service provider 30, the cloud service provider 30 returns the ciphertext tokens (e.g. "792," "416," . . . ). The OPT method implemented in the proxy server 25 performs a table look-up in the mapping tabling using the received ciphertext tokens to recover the corresponding plaintext terms. The proxy server 25 then returns the plaintext terms (e.g. "Paul," "Joe") to the user 18.

FIG. 4 further illustrates an example of a query operation using the OPT method of the present invention. When the user 18 of the enterprise wishes to sort or perform a range query for data stored in the cloud service provider 30, the user 18 may transmit a query request. For example, the user may transmit a query request for "all plaintext having the first letter of P or lower in the alphabet". The proxy server intercepts the query request. The OPT method transforms the query request in plaintext to a query request based on the ciphertext. For example, the OPT method generates the query request as "all ciphertext less than 850" in response to the plaintext query request. The plaintext "P" may be a previously processed term and the OPT encryption system 26 may be able to perform a table look-up from the mapping table 50 to retrieve the corresponding ciphertext term "850". Alternately, the plaintext "P" may not be present in the mapping table and the OPT method generates the ciphertext term "850" corresponding to the plaintext "P."

The proxy server 25 forwards the query request ("ciphertext<=850") to the cloud service provider 30. The cloud service provider 30 operates on the ciphertext-based query request and generates the query result. In the present example, the cloud service provider 30 returns the query result "213, 416, 792" to the proxy server 25. The OPT method decrypts or decodes the query result C4 using the plaintext-to-ciphertext mapping table 50. The OPT method retrieves the plaintext terms "Bill, Joe, Paul" from the mapping table 50. The proxy server 25 then returns the plaintext query result "Bill, Joe, Paul" to the user 18.

Figure 5:
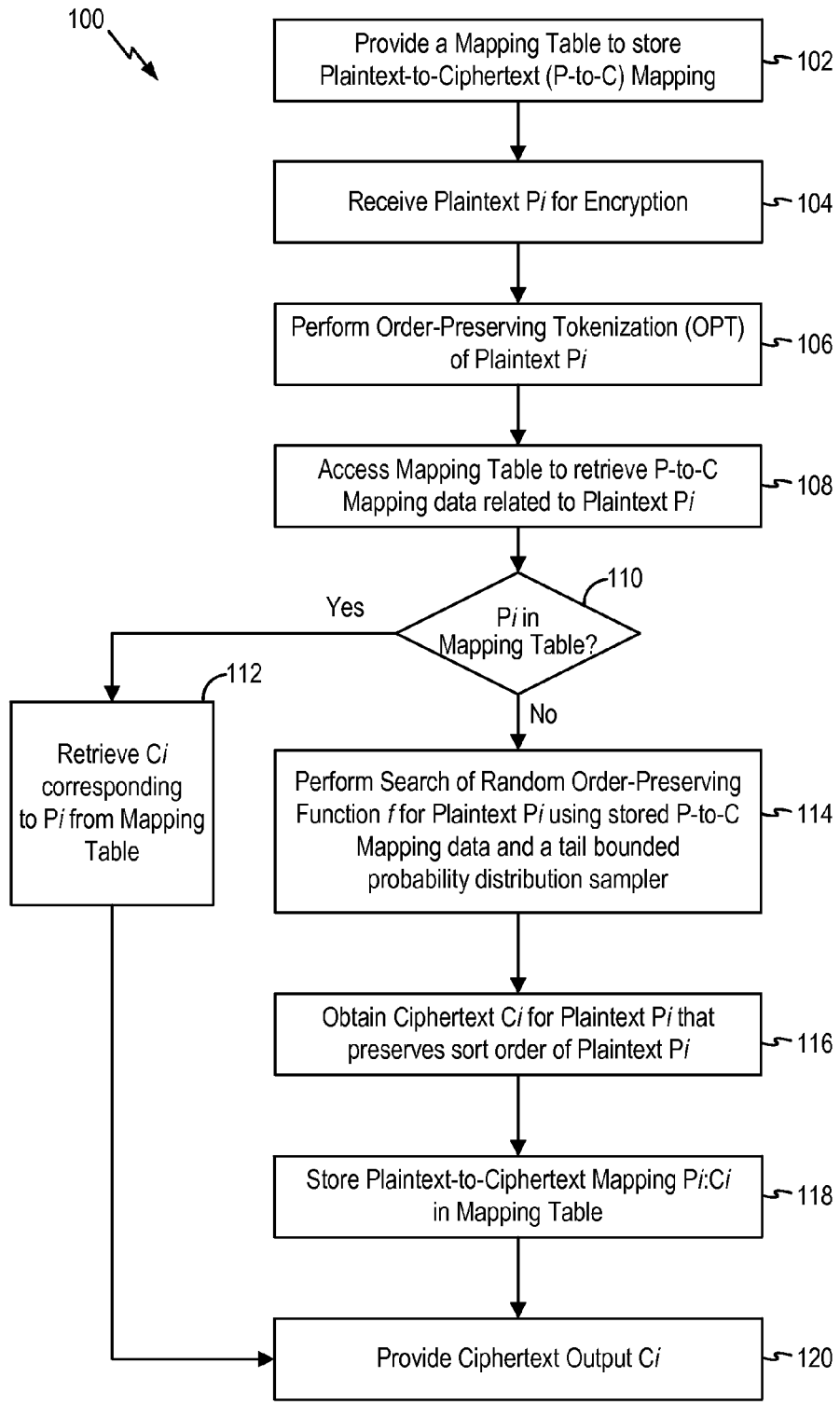
FIG. 5 is a flowchart illustrating an OPT method in embodiments of the present invention.

FIG. 5 is a flowchart illustrating an OPT method in embodiments of the present invention. Referring to FIG. 5, an OPT method 100 provides a mapping table to store plaintext-to-ciphertext mapping data (102). In some embodiments, the mapping table is initially empty. That is, no a priori plaintext-to-ciphertext mapping data needs to be generated.

The OPT method 100 then receives plaintext Pi for encryption (104). The OPT method 100 performs order-preserving tokenization of the plaintext Pi (106). The order-preserving tokenization operation starts with accessing the mapping table to retrieve plaintext-to-ciphertext mapping data related to the plaintext Pi (108). The OPT method 100 determines if the plaintext Pi is already present in the mapping table indicating that the plaintext Pi has been previously encrypted (110). In the case the plaintext Pi is already present in the mapping table, the OPT method 100 retrieves the corresponding ciphertext Ci from the mapping table (112) and provide the ciphertext output Ci (120).

In the event that the plaintext Pi is not present in the mapping table, the OPT method 100 performs search of a random order-preserving function $f$ for the plaintext Pi using the stored plaintext-to-ciphertext mapping data and a tail bounded probability distribution sampler (114). In one embodiment, the OPT method uses a tail bounded hypergeometric distribution sampler as the probability distribution sampler. More specifically, even though the plaintext Pi may not be present in the mapping table, other plaintext terms close in sort order to the plaintext Pi may be present. In that case, mapping data relating to the input plaintext Pi, that is mapping data relating to plaintext terms that are close in sort order to the input plaintext Pi will be used to accelerate the OPT operation. For example, the plaintext Pi may be "Jane" and mapping data for plaintext terms "Jal" and "Kai" may be retrieved. As a result of the search operation, the OPT method 100 obtains the ciphertext Ci for plaintext Pi that preserves the sort order of plaintext Pi (116). The OPT method 100 stores the plaintext to ciphertext mapping in a mapping table (118). The OPT method 100 then provides the ciphertext output Ci (120).

Figure 6:
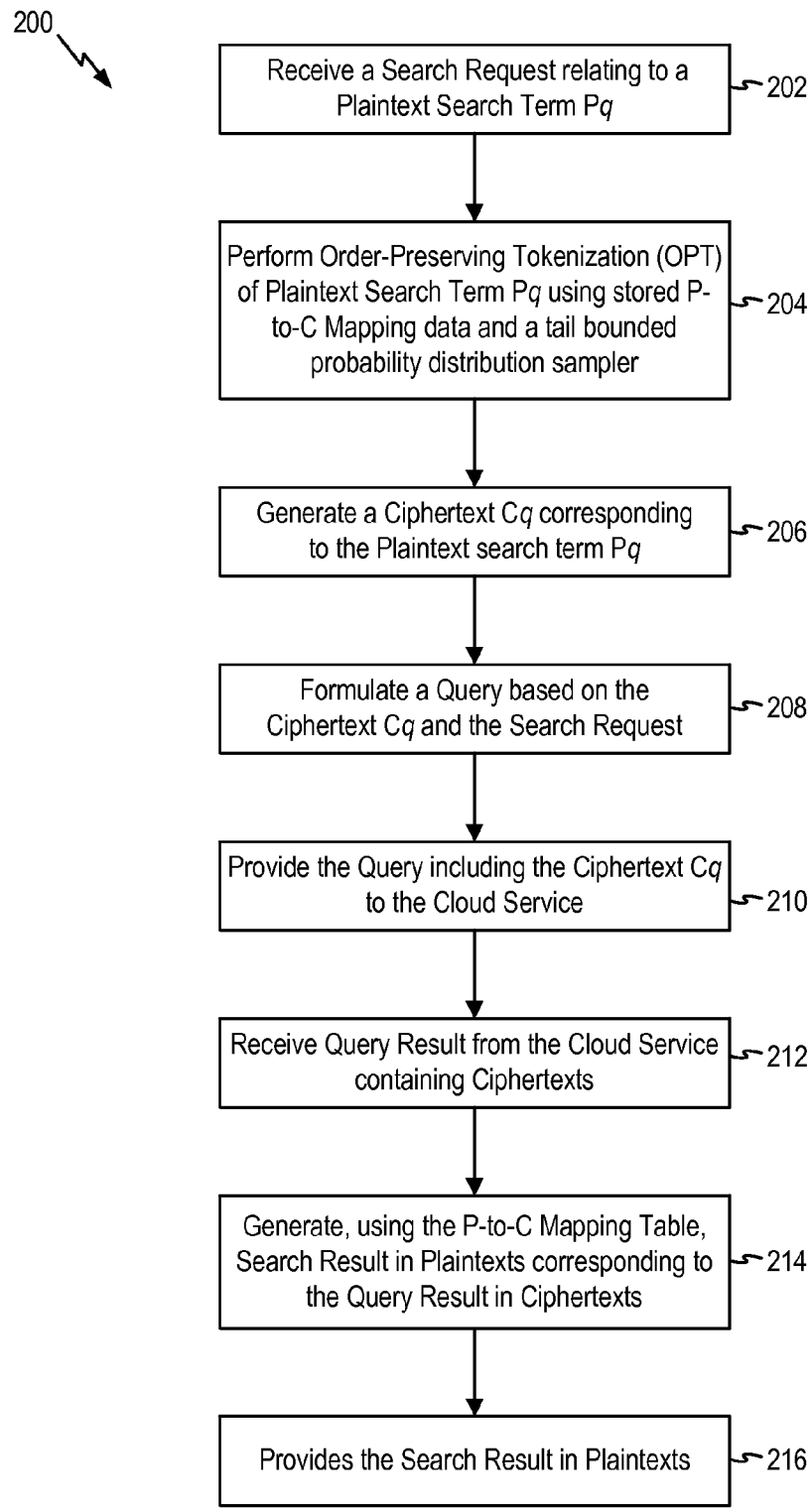
FIG. 6 a flowchart illustrating the OPT method for performing a query in embodiments of the present invention.

FIG. 6 a flowchart illustrating the OPT method for performing a query in embodiments of the present invention.

Referring to FIG. 6, the OPT method 200 receives a search request relating to plaintext search term Pq (202). The method 200 performs order-preserving tokenization of the plaintext search term Pq by using the stored plaintext-to-ciphertext mapping data and a tail bounded probability distribution sampler (204). In particular, the order-preserving tokenization method 100 of FIG. 5 can be used. For instance, the method 200 may access the mapping table to determine if the plaintext search term Pq is already in the mapping table. In the event the plaintext search term Pq is not in the mapping table, the method 200 can then perform a search of the random order-preserving function $f$ for the plaintext search term Pq using the stored mapping data and a tail bounded probability distribution sampler.

The method 200 then generates a ciphertext Cq corresponding to the plaintext search term Pq (206). The method 200 then formulates a query based on the ciphertext Cq and the search request (208). The method 200 provides the query including the ciphertext Cq to the cloud service provider (210). Then, the method 200 receives query result from the cloud service provider containing ciphertexts (212). The method 200 then generates search result in plaintexts corresponding to the query result in ciphertexts using the plaintext-to-ciphertext mapping table (214). The method 200 then provides the search result in plaintexts (216).

A salient feature of the OPT method of the present invention is that the generation of the ciphertext token makes use of stored plaintext-to-ciphertext mapping data to substantially accelerate the recursive sampling operation to derive the ciphertext.

Conventional order preserving encryption schemes performs a binary search of the order preserving function by always search at the mid-point of the range so as to ensure that the OPE scheme is always sampling from the same function. The conventional OPE scheme keeps sampling at the mid-point of the range to recur down to the domain corresponding to the plaintext. Thus, the search time is typically very long. Traditional OPE has to starts the sampling at the mid-point to ensure the algorithm always sample from the same function so that order is preserved. For instance, when sampling is started at the mid-point, then the algorithm knows that there are X points below the midpoint. Because the points are order-preserving, then know the order of the plaintext and ciphertext. Conventional OPE algorithms keeps sampling the midpoints until the algorithm recur down to a ciphertext range corresponding to the plaintext of interest and the corresponding ciphertext can be obtained.

In the OPT method of the present invention, with the stored plaintext-to-ciphertext mapping, the OPT method does not have to start the search of the domain space at the mid-point. Rather, the OPT method can start sampling at some point with high probability that the ciphertext will reside. With the stored or known plaintext-to-ciphertext mapping information, the OPT method can make more precise guess of where to start the searching for the ciphertext. The OPT method therefore can search in a smaller ciphertext space and can recur down to the desired domain more quickly.

Furthermore, because legacy ciphertext values are stored, the OPT method can ensure that sampling is performed on the same order-preserving function without having to sample the whole function at every recursive cycle. By way of explanation, conventional OPE algorithms have to regenerate the plaintext-to-ciphertext mapping table every single recursion. On the other hand, using the OPT method of the present invention, the plaintext-to-ciphertext mapping is stored in the mapping table and thus the encoding operation can be performed much more efficiently.

Storing the plaintext-to-ciphertext mapping provides various advantages. First, the asymptotic complexity is better so that the algorithm is faster. Second, the mapping table allows the OPT method to make a more precise initial guess of where the ciphertext may be. Thus, the algorithm can search in a smaller space and can perform more quickly in the recursion. Third, the OPT method can use a faster probability sampling algorithm with less precision than required for conventional OPE method because the OPT method can make a better guess of where the ciphertext probably will be.

Moreover, in some embodiments, the OPT method of the present invention uses a tail bounded hypergeometric distribution sampler (or sampling algorithm) to bound the possible values for the recursive sampling operations. The OPT method can sample the order preserving function at a location where there is a high probability that the ciphertext is located, rather than searching always at the mid-points. Accordingly, fewer calls to the hypergeometric distribution sampler need to be made and the call to the hypergeometric distribution sampler can be of lower precision.

More specifically, in some embodiments of the present invention, the OPT method exploits the tail bound property of the hypergeometric distribution function. That is, the tail of the hypergeometric distribution function decays very rapidly. The OPT method applies a tail bound or tail inequality to the hypergeometric distribution function to use as the tail bound hypergeometric distribution sampler. In other words, the OPT method uses a tail bound to bound the possible values to search the ciphertext space.

In the present description, tail bounds or tail inequalities bound the probability that a random variable with a bell-shaped distribution takes a value in the tails of the distribution, far away from the mean. That is, tail bound means that for a given distribution, the probability that any randomly selected variable would be out at the tail is very small. So by using a tail bounded probability distribution sampler, the OPT method of the present invention does not have to start searching the ciphertext space at the mid-point. Rather, the OPT method can start in a different location knowing that the tail area has low probability of containing the desired ciphertext value. The OPT method can thus make much fewer calls to the probability distribution sampler.

In the above-described embodiments, the mapping table is initially empty and is populated as plaintext terms are being processed. In alternate embodiments of the present invention, the OPT method may store some initial plaintext-to-ciphertext mapping data to facilitate the OPT encoding process. For example, certain commonly used plaintext terms or the letters of the alphabet or numbers from 1-100 may be stored with their corresponding ciphertexts. In general, it is not necessary and often impossible to store the plaintext-to-ciphertext mapping data form the entire domain of the plaintext. The OPT method of the present invention improves the efficiency of the order preserving tokenization by storing plaintext-to-ciphertext mapping as plaintext terms are being processed. Providing initial mapping data is not required but will enhance the efficiency of the OPT method.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing order-preserving encryption of an input plaintext and generating an output ciphertext where the output ciphertext preserves the sort order of the input plaintext, the method comprising:
   providing a mapping table to store plaintext-to-ciphertext mapping data;
   receiving the input plaintext;
   performing, using a processor, order-preserving tokenization of the input plaintext using a random order-preserving function;
   accessing the mapping table to retrieve plaintext-to-ciphertext mapping data relating to the input plaintext;
   in response to the input plaintext not being present in the mapping table, performing, using the processor, a search of the random order-preserving function for the input plaintext using the retrieved plaintext-to-ciphertext mapping data and a tail bounded probability distribution sampler to recursively sample the random order-preserving function, the tail bounded probability distribution sampler bounding the possible values for the recursive sampling operations to search the random order-preserving function for the input plaintext at a location with a high probability of locating a ciphertext corresponding to the input plaintext, wherein performing the search comprises performing the search of the random order-preserving function for the input plaintext using the retrieved plaintext-to-ciphertext mapping data and the tail bounded probability distribution sampler to start sampling the random order-preserving function at a point in a ciphertext space of the random order-preserving function indicated by the retrieved plaintext-to-ciphertext mapping data to have a high probability of locating the desired ciphertext;
   obtaining the ciphertext for the input plaintext as a result of the searching;
   storing the plaintext-to-ciphertext mapping for the input plaintext in the mapping table; and
   providing the ciphertext as the output ciphertext.

2. The method of claim 1, wherein performing, using the processor, the search of the random order-preserving function for the input plaintext using the retrieved plaintext-to-ciphertext mapping data and the tail bounded probability distribution sampler to recursively sample the random order-preserving function comprises:
   performing, using the processor, the search of the random order-preserving function for the input plaintext using the retrieved plaintext-to-ciphertext mapping data and a tail bounded hypergeometric distribution sampler to recursively sample the random order-preserving function.

3. The method of claim 1, wherein providing a mapping table comprises providing a mapping table that is initially empty.

4. The method of claim 1, wherein providing a mapping table comprises providing a mapping table that contains initial plaintext-to-ciphertext mapping data.

5. The method of claim 1, further comprising:
   in response to the input plaintext being present in the mapping table, retrieving the corresponding ciphertext as the output ciphertext.

6. The method of claim 1, wherein accessing the mapping table to retrieve plaintext-to-ciphertext mapping data relating to the input plaintext comprises:
   accessing the mapping table to retrieve plaintext-to-ciphertext mapping data of one or more plaintext terms in the mapping table that are close in sort order to the input plaintext.

7. The method of claim 1, wherein performing, using the processor, the search of the random order-preserving function for the input plaintext using the retrieved plaintext-to-ciphertext mapping data and the tail bounded probability distribution sampler to recursively sample the random order-preserving function comprises:
   performing, using the processor, the search of the random order-preserving function for the input plaintext using the retrieved plaintext-to-ciphertext mapping data and the tail bounded probability distribution sampler to start sampling the random order-preserving function at a point in a ciphertext space of the random order-preserving function other than the mid-point.

8. A system for performing order-preserving encryption of an input plaintext and generating an output ciphertext where the output ciphertext preserves the sort order of the input plaintext, the system comprising:
   a processor configured to:
      provide a mapping table to store plaintext-to-ciphertext mapping data;
      receive the input plaintext;
      perform, using a processor, order-preserving tokenization of the input plaintext using a random order-preserving function;
      access the mapping table to retrieve plaintext-to-ciphertext mapping data relating to the input plaintext;
      in response to the input plaintext not being present in the mapping table, perform, using the processor, a search of the random order-preserving function for the input plaintext using the retrieved plaintext-to-ciphertext mapping data and a tail bounded probability distribution sampler to recursively sample the random order-preserving function, the tail bounded probability distribution sampler bounding the possible values for the recursive sampling operations to search the random order-preserving function for the input plaintext at a location with a high probability of locating a ciphertext corresponding to the input plaintext, wherein the search of the random order-preserving function for the input plaintext is performed using the retrieved plaintext-to-ciphertext mapping data and the tail bounded probability distribution sampler to start sampling the random order-preserving function at a point in a ciphertext space of the random order-preserving function indicated by the retrieved plaintext-to-ciphertext mapping data to have a high probability of locating the desired ciphertext;
      obtain the ciphertext for the input plaintext as a result of the searching;
      store the plaintext-to-ciphertext mapping for the input plaintext in the mapping table; and
      provide the ciphertext as the output ciphertext; and
   a memory coupled to the processor and configured to provide the processor with instructions.

9. The system of claim 8, wherein the processor is further configured to perform the search of the random order-preserving function for the input plaintext using the retrieved plaintext-to-ciphertext mapping data and a tail bounded hypergeometric distribution sampler to recursively sample the random order-preserving function.

10. The system of claim 8, wherein the processor is further configured to provide a mapping table that is initially empty.

11. The system of claim 8, wherein the processor is further configured to provide a mapping table that contains initial plaintext-to-ciphertext mapping data.

12. The system of claim 8, wherein the processor is further configured to, in response to the input plaintext being present in the mapping table, retrieve the corresponding ciphertext as the output ciphertext.

13. The system of claim 8, wherein the processor is further configured to access the mapping table to retrieve plaintext-to-ciphertext mapping data of one or more plaintext terms in the mapping table that are close in sort order to the input plaintext.

14. The system of claim 8, wherein the processor is further configured to perform, using the processor, the search of the random order-preserving function for the input plaintext using the retrieved plaintext-to-ciphertext mapping data and the tail bounded probability distribution sampler to start sampling the random order-preserving function at a point in a ciphertext space of the random order-preserving function other than the mid-point.

\* \* \* \* \*